Nov. 11, 1947.     R. D. ACTON     2,430,597
IMPLEMENT ADJUSTING MECHANISM
Original Filed Sept. 21, 1942    6 Sheets-Sheet 1
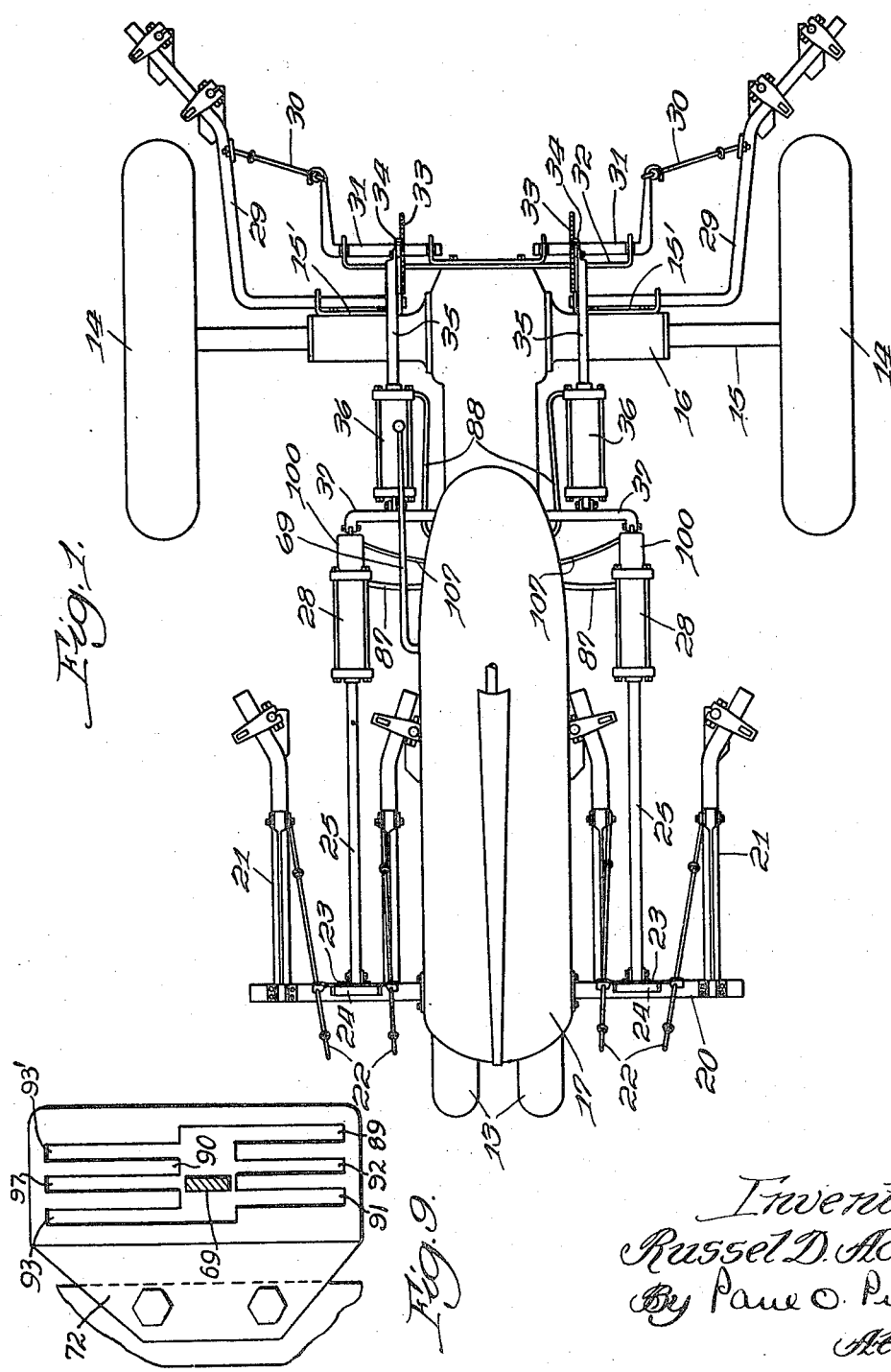
Inventor:
Russel D. Acton.
By Paul O. Pippel
Atty.

Nov. 11, 1947.  R. D. ACTON  2,430,597
IMPLEMENT ADJUSTING MECHANISM
Original Filed Sept. 21, 1942   6 Sheets-Sheet 2
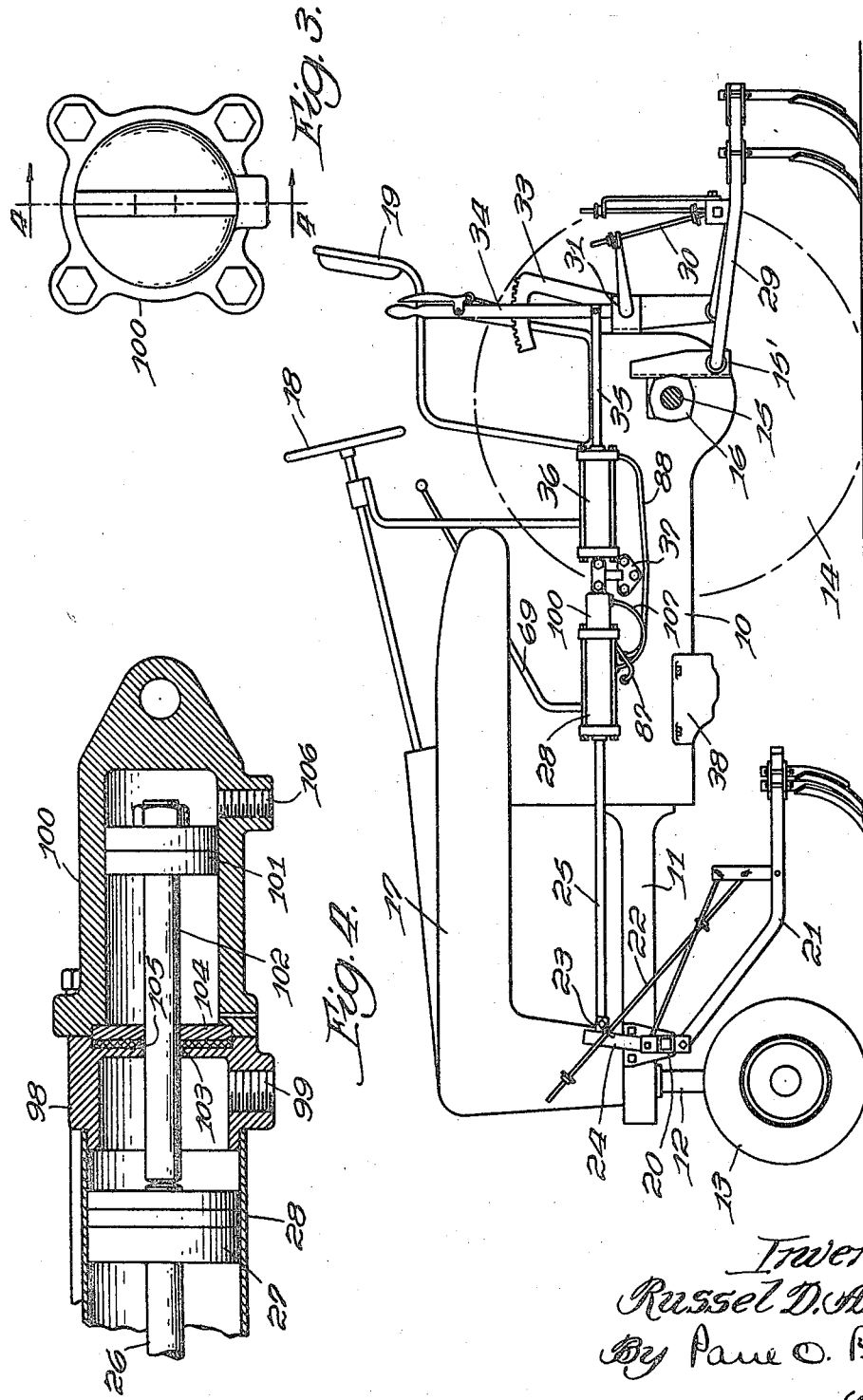
Inventor:
Russel D. Acton.
By Paul O. Pippel
Atty.

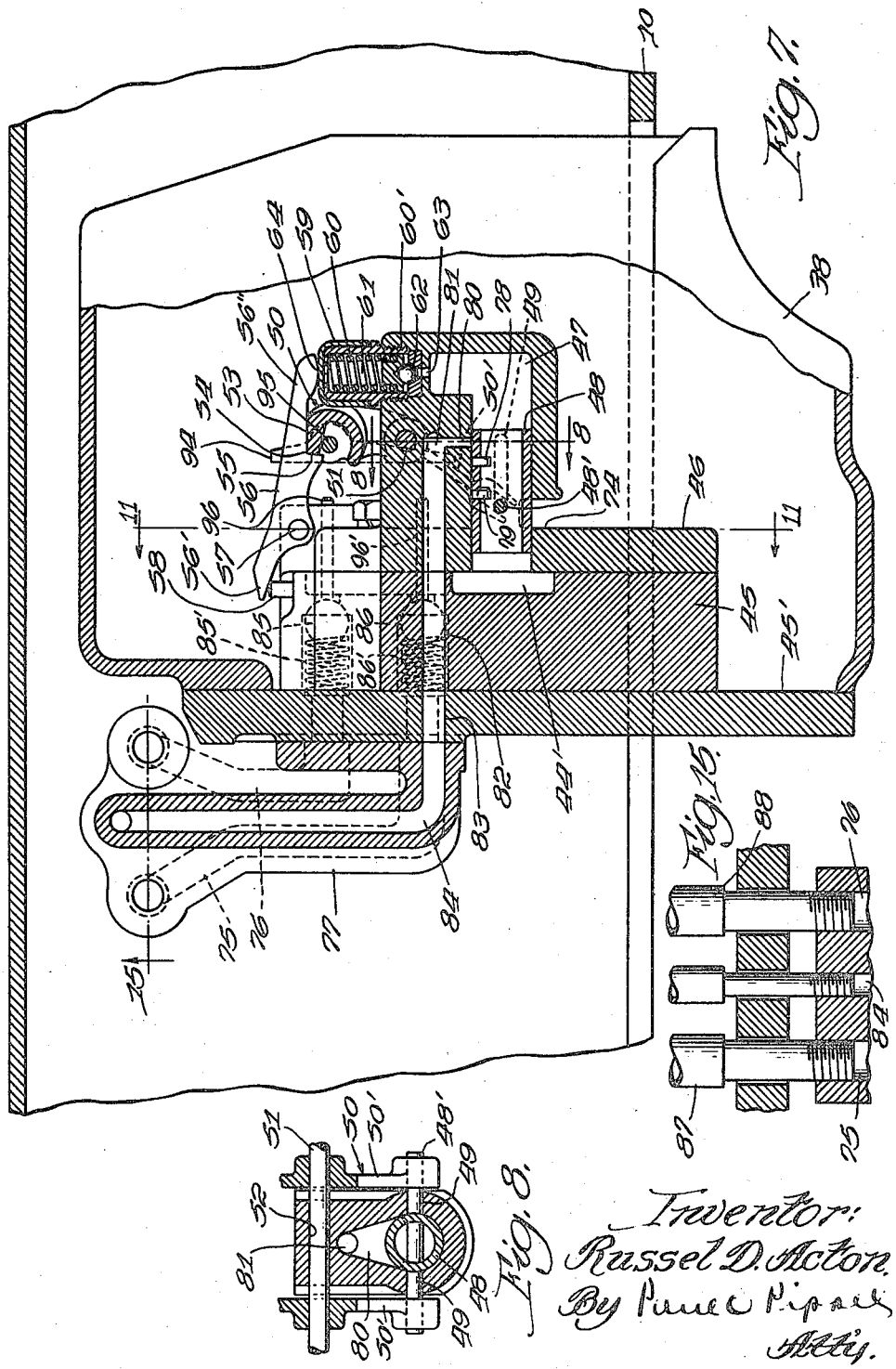

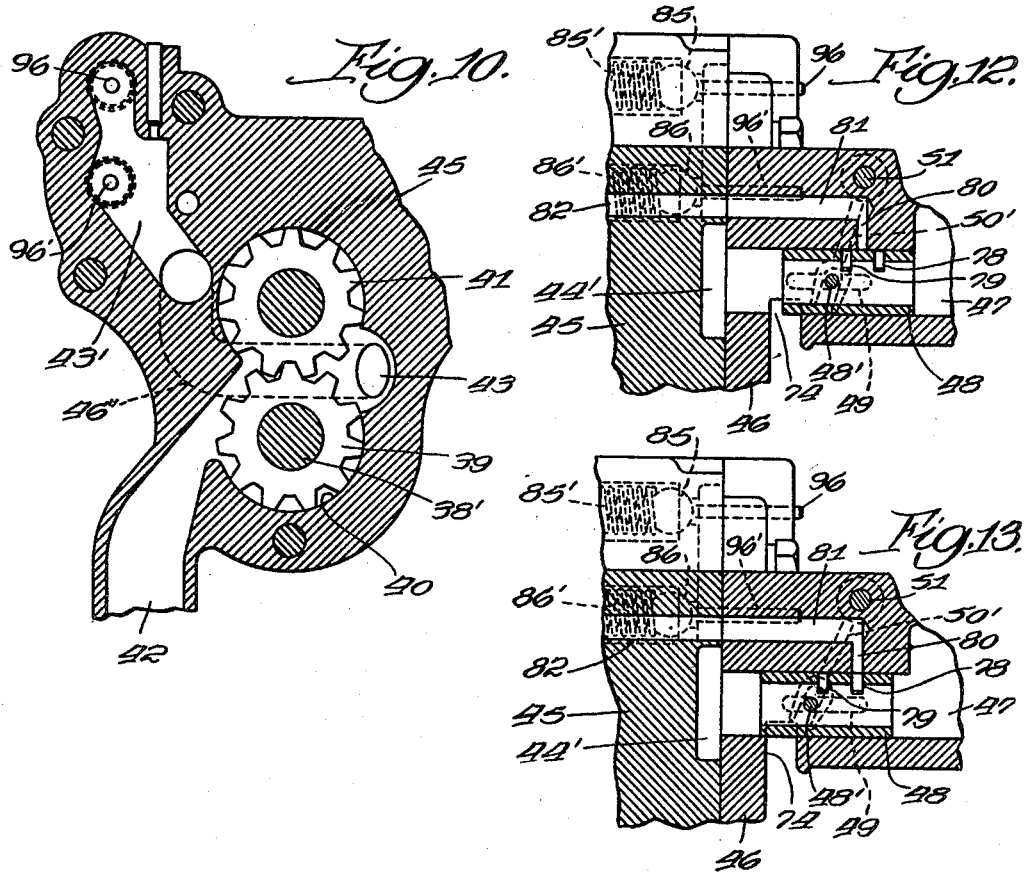
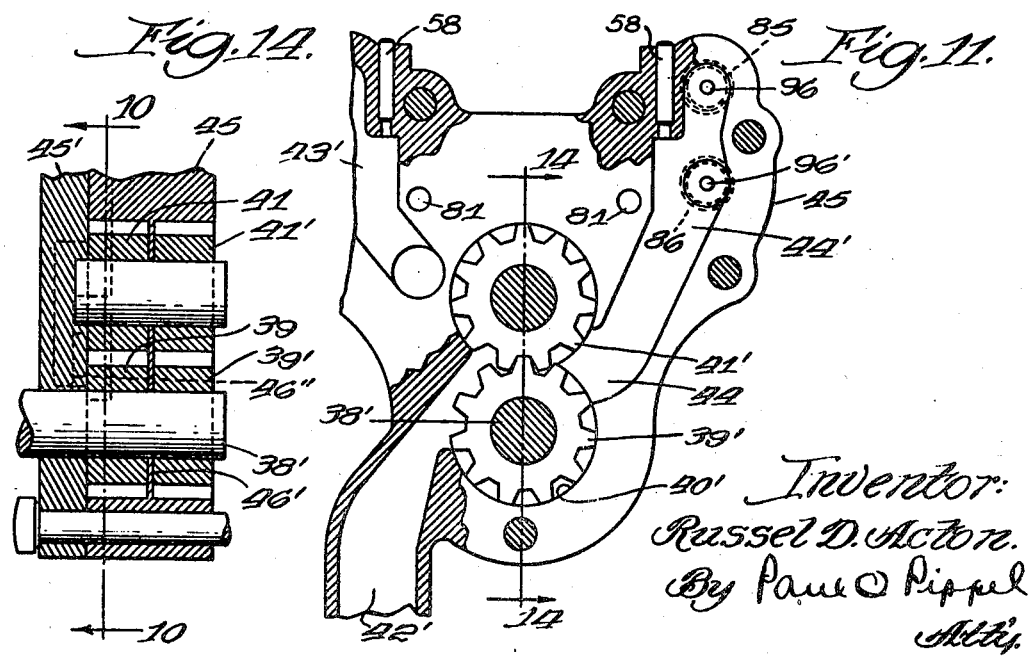

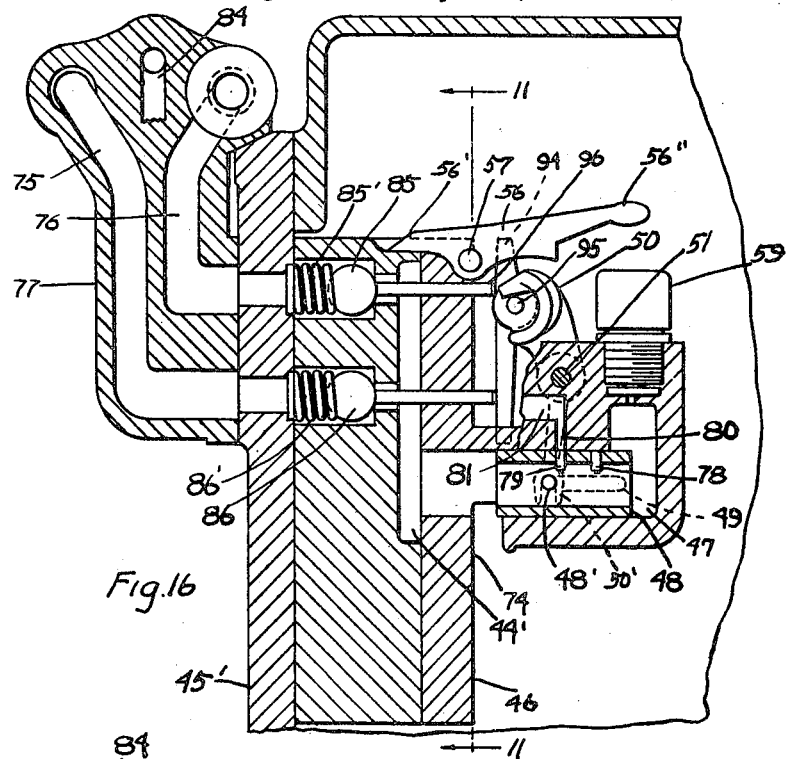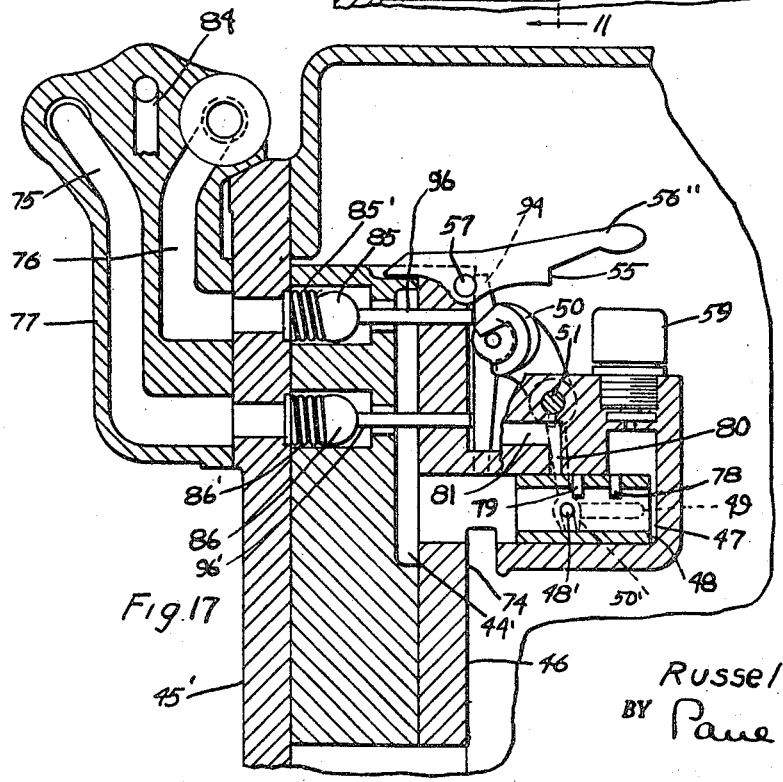

Patented Nov. 11, 1947

2,430,597

UNITED STATES PATENT OFFICE 2,430,597

IMPLEMENT ADJUSTING MECHANISM

Russel D. Acton, Chicago, Ill., assignor to International Harvester Company, a corporation of New Jersey Continuation of application Serial No. 459,112, September 21, 1942. This application April 13, 1944, Serial No. 530,779

27 Claims. (Cl. 97—50)

1

This invention, which is a continuation of my previous application, Serial No. 459,112, filed September 21, 1942, for Implement adjusting mechanism, relates to a hydraulic lift system for tractors having a plurality of implements independently connected thereto. More specifically, the invention relates to an improved hydraulic lift means and controls therefor to provide for adjustment of independent implements apart from the normal lifting and lowering operations.

The principal object of the invention is to provide hydraulic lifting mechanisms for lifting and adjusting implements by means of which the implements may be adjusted in working position and lifted and returned to working position without disturbing the adjustment. More specifically, the invention relates to a fluid-pressure device lifting mechanism and a control valve mechanism therefor in which an adjustable stop device is utilized for determining the maximum travel of the fluid-pressure device in one direction.

Another specific object is to provide a control device by means of which a fluid-pressure lifting device may be operated along with a stop mechanism or independent of the stop mechanism.

These objects and others which will be apparent are accomplished by a construction such as embodied in the drawings, in which:

Figure 1 is a plan view of a conventional general-purpose type of tractor having implements mounted thereon and including the hydraulic lift system of the invention.

Figure 2 is a side elevation of the structure shown in Figure 1;

Figure 3 is an end elevation of one of the lifting and adjusting fluid-pressure devices;

Figure 4 is a cross section through one of the fluid-pressure devices showing the adjustable stop mechanism;

Figure 7 is a section taken on the line 7—7 of Figure 5 showing the valve mechanism within the power lift casing;

Figure 8 is a section taken on the line 8—8 of Figure 7;

Figure 9 is a section taken on the line 9—9 of Figure 5 rotated through 180 degrees;

Figure 10 is a section taken on the line 10—10 of Figure 14;

2

Figure 5:
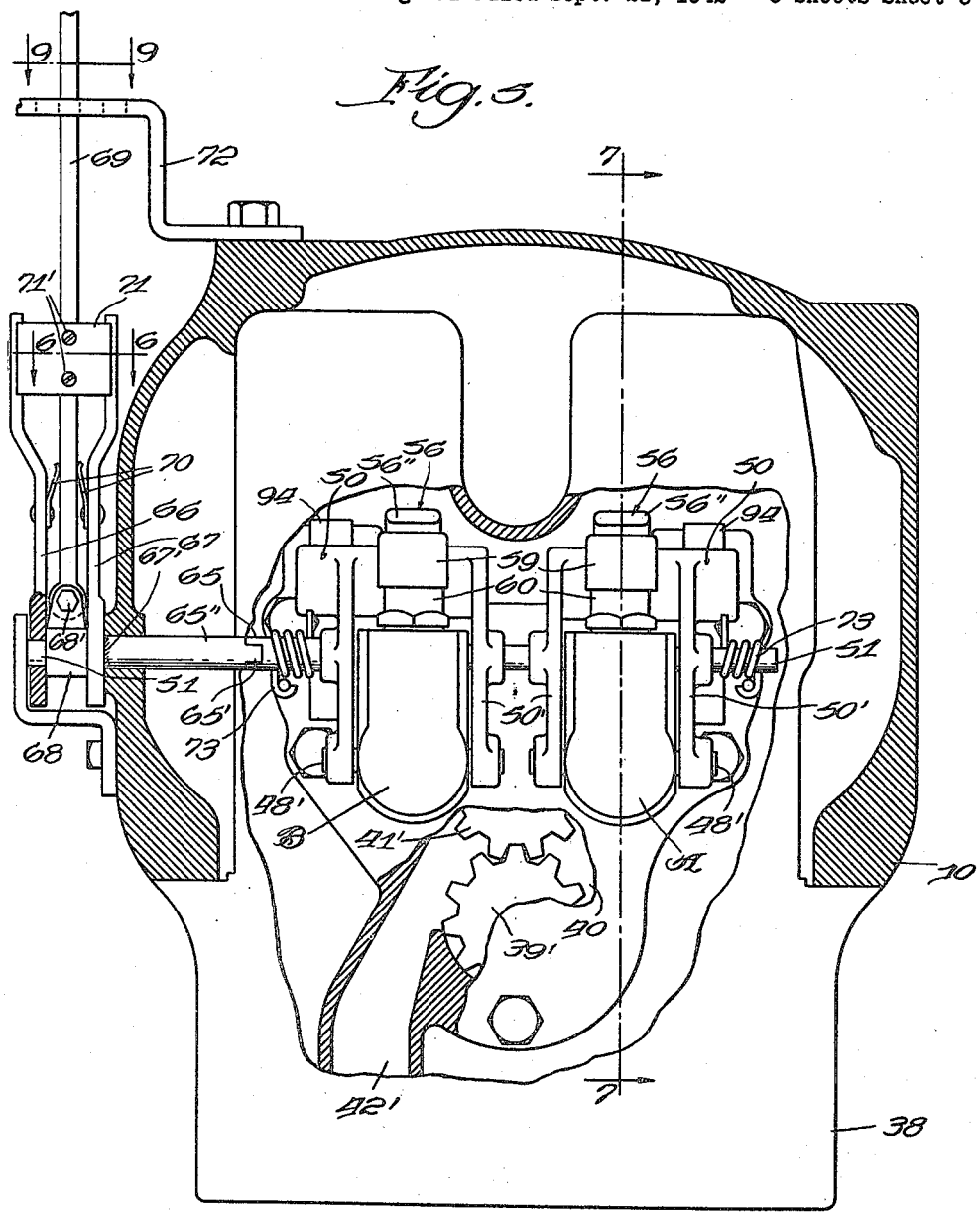
Figure 5 is a vertical transverse section through the body of the tractor with a portion of the power lift mechanism casing broken away to show the structure thereof.

Figure 11 is a sectional view of the mechanism shown in Figure 5 viewed as if taken on the line 11—11 of Figure 7;

Figures 12 and 13 show different positions of the control valve portion of Figure 7;

Figure 14 is a section taken on the line 14—14 of Figure 11;

Figure 15 is a section taken on the line 15—15 of Figure 7.

Figure 16 is a sectional view similar to Figure 12 showing a different valve position and with a portion of the structure broken away by a secondary section to better show the fluid conduits; and Figure 17 is identical with Figure 16 except that another valve position is shown.

Figures 1 and 2 illustrate a conventional type of general-purpose tractor with implements of a well-known type connected thereto. The tractor consists essentially of a rear body portion 10 and front frame structure 11, a front bolster 12 carrying dirigible wheels 13, rear traction wheels 14 mounted on axles 15 extending from axle housings 16, a radiator hood and fuel tank superstructure 17, a steering wheel 18, and an operator's station 19. Transverse, laterally extending tool bars 20 at the front of the tractor carry cultivating beam structures 21 adapted to be lifted by lift rods 22 connected to brackets 23, which are in turn connected to lifting levers 24 pivotally mounted on the transverse tool bars 20. A push rod 25 at each side of the tractor is connected to one of the levers 24 and is in effect an extension of a piston rod 26 extending from a piston 27 mounted for reciprocation in a cylinder 28. Said piston and cylinder along with mechanism to be hereinafter described make up a fluid-pressure device.

At the rear of the tractor, tool-carrying bars 29 are pivoted to brackets 15' on the rear axle structures 16 of the tractor, said tool bars being adapted to be lifted by lifting rods 30 connected to lifting arms of rock shafts 31 pivotally mounted at the rear of the tractor on a bracket structure 32. Quadrants 33 carried on the independent rock shafts 31 at the opposite sides of the tractor are engageable by adjusting levers 34 which are pivoted on the rock-shafts. The levers 34 are connected by push rods 35 with lifting cylinders 36. As illustrated, the cylinders 28 and the cylinders 36 are respectively pivotally connected to react against laterally extending brackets 37 secured to the rear body portion 10 of the tractor.

A casing 38 is inserted through an opening in the bottom of the rear portion 10 of the tractor, as shown in Figures 2 and 7. Said casing encloses the pump mechanism and the valve control mechanism for the supply of fluid under pressure to the lifting cylinders 28 and 36. Except for a duplication of parts, which will be hereinafter described, this mechanism is very similar to that shown and described in U. S. Patent 2,324,866, issued July 20, 1943, to Carl W. Mott, and shows one means of supplying fluid under pressure and of controlling the flow of fluid to and from the lifting cylinders. It will be apparent, however, as the description continues that the invention can be adapted to other systems of fluid pressure supply.

A pump drive shaft 38', which is adapted to be driven from the rear end of the tractor transmission, as shown in the Mott Patent 2,269,983, extends through an end wall of the casing 38 and carries, mounted thereon, pump gears 39 and 39'. These gears 39 and 39' are respectively located in pump chambers 40 and 40' and cooperate respectively with a second set of pump gears 41 and 41'. The shaft 38' operates in such direction as to operate the gear pumps to obtain liquid through intake passages 42 and 42', respectively, communicating with the bottom of the casing 38 which serves as a reservoir. Fluid from the pump gears 39 and 41 is delivered under pressure to the high pressure side of the pump chamber shown in Figure 10 which communicates by means of a conduit 43 with a chamber 43'. Fluid from the gears 39' and 41' is delivered under pressure through the conduit 44 to a chamber 44'.

By inspection of Figure 7, it will be understood that the pump housing and valve structure consists of a first or pump housing 45 which fits against the wall plate 45' of the casing 38, and a second or valve housing 46 which abuts against the forward face of the first housing 45. The housing 45, as best shown in Figure 14, is formed with a dividing wall 46' between the pump chambers which are completed by the wall plate 45' abutting the rear face of the pump gears 39 and 41 and the face of the housing 46 abutting the forward face of the pump gears 39' and 41'. The housing 45 has the conduit 44 and the chamber 44' which forms means of communication between the pump, the valve device and the outlet conduits, and the conduit 43 which communicates, by means of a conduit 46'' formed in the face of wall plate 45' of the casing, with the chamber 43'.

Referring to Figure 7, the valve housing 46 is provided with a longitudinal bore 47 which communicates with the high pressure fluid chamber 44'. A sleeve 48 mounted for reciprocation in said bore is carried on a transverse pin 48' which projects through slots 49 in opposite walls of the bore, projecting outwardly as shown in Figure 8. An actuating member 50 has two spaced arms 50' rigidly secured to a shaft 51 which extends through a bore 52 in the valve housing 46. Said spaced arms 50' extend downwardly and slidably engage the pin 48' which projects through the sleeve 48, as shown in dotted lines in Figure 7.

The actuating member 50 is provided with a head portion 53 formed with a shoulder 54 engageable with a notch 55 on a latch member 56. Said latch member is pivoted on the housing 46 at 57 and carries an extension arm 56' engageable with a plunger 58 in the pump housing 45 adapted to be actuated by the fluid pressure in the chamber 44' as best shown in Figures 7 and 11. The latch member 56 also has an extension arm 56'' at its other end engageable with a cap 59 slidably fitted over a hollow fitting 60 threaded into a threaded opening 60' in the housing member 46. Said fitting includes a spring 61 acting to normally maintain a ball valve 62 in position to close an opening 63 communicating with the interior of the housing 46. An opening 64 in the top of the fitting 60 permits fluid flow when the valve 62 is opened by pressure to lift the cap 59 and thereby lift the extension arm 56'' of the latch member 56.

Figure 6:
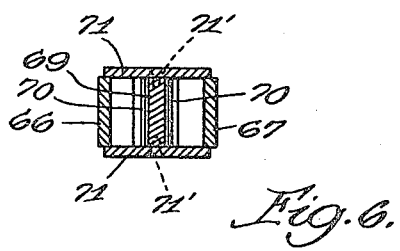
Figure 6 is a section taken on the line 6—6 of Figure 5 showing the selection means for operating the independent power lift devices.

The shaft 51, previously referred to, extends laterally through a sleeve 65, corresponding to the shaft 51 of the control device just described, in a second control device, which, in other respects, exactly is identical with the device just described and bears corresponding numerals. For convenience these control devices may be designated as units A and B respectively. The shaft 51 extends through the side wall of the casing 38, through the adjacent side wall of the tractor body 10 and is rigidly secured to an operating member 66. Coupled as indicated at 65' is an extension 65'' which likewise extends outside the tractor and is rigidly secured to an operating member 67 by the welded connection indicated at 67'. A sleeve 68, rotatably mounted on the shaft 51 between the members 66 and 67, provides a means for pivotally attaching on a longitudinal axis an operating lever 69, in the manner indicated at 68', and which extends upwardly and rearwardly to within reach of the operator. Leaf springs 70 normally maintain the lever 69 in a vertical position between the two operating members 66 and 67. Spaced plates 71, rigidly secured to the lever 69 by screws 71', are of an extent sufficient to engage both the operating members 66 and 67 when the control lever 69 is in its central position, see Figure 6. As shown in Figure 9, a slotted plate 72, secured to the tractor, is provided for positively guiding different positions of the control lever 69. This lever 69 can be either pulled directly back or pushed forwardly with a slight lateral movement. In both movements, both of the operating members 66 and 67 are carried with the lever. The lever can also be moved in lateral directions and thereafter moved either forwardly or rearwardly.

Springs 73, as shown in Figure 5, are provided respectively with the valve units for urging the actuating members 50 in a direction to move the sleeve 48 to open position to the right, as viewed in Figure 12. The latch member 56 is therefore engageable with the head portion 53 of the actuating member 50 to prevent the return of the sleeve to open position as shown in Figure 7.

The sleeve member 48, as shown in Figures 7, 12, 13, 16, and 17 is adapted to move in an axial direction to regulate the flow of liquid through an arcuate opening 74 formed in the valve housing 46. When in the closed position of Figure 7, liquid pressure is built up in the chamber 44', as shown in Figure 11, whereby fluid is delivered through conduits 75 and 76 formed in an outlet member 77 secured to the outer face of the wall plate 45' of the casing 38.

The sleeve 48 is provided in its upper side with two arcuate slots 78 and 79, the shape of which is shown in the cross sectional view in Figure 7. The slots are positioned to communicate, during the travel of the sleeve 48, with a vertically extending passage 80 communicating with a horizontal bore or passage 81. The horizontal bore communicates with an axially alined bore 82 in the pump housing 45. A third bore 83 in the wall plate 45' communicates with the bore 82 and with an intermediate conduit 84 in the outlet member 77.

With the sleeve 48 in the position shown in Figure 7, fluid delivered by the pump gears 39' and 41' cannot escape through the port 74 whereby a pressure is built up in the chamber 44'. This pressure unseats ball valves 85 and 86 which are held respectively in closed position by compression springs 85' and 86', thereby permitting the flow of fluid into the conduits 75 and 76 and therefrom through the flexible conduits 87 and 88 to the cylinders 28 and 36 connected, respectively, to the lifting linkage at the front and rear of the tractor. Pressure applied to these cylinders lifts the front and rear rigs at that side of the tractor to their transport positions whereupon the pistons in the cylinders reach the end of their strokes. Pressure then builds up in the bore 47 sufficiently to unseat the ball valve 62 against the compression spring which holds it in seated position, thereby permitting liquid to flow through the opening 64 in the fitting 60 to raise the cap 59 to release the latch member 56. When said latch member is released, the spring 73 rotates the member 50 to return the sleeve 48 to the neutral position shown in Figure 7. The opening 74 is thus uncovered to bypass the fluid supplied by the pump gears, whereupon the ball valves 85 and 86 are seated by their springs to lock the fluid in the cylinders and to hold the implements in their lifted position.

Referring to Figures 5 and 9, to accomplish the operation just described of lifting the implements at one side of the tractor, assuming they are in soil-working position, the lever 69 is moved entirely to the left and then shifted rearwardly into the slot 89. This movement engages the arm 66 which, as previously described, is secured to the shaft 51 which carries the actuating member 50 of valve unit A at the right side of the structure shown in Figure 5. Rearward movement of the lever into the slot 89 moves the sleeve 48 to the position shown in Figure 7 whereby pressure is built up in the chamber 44'. This pressure acts against the plunger 58 to rotate the latch member 56 sufficiently to engage the notch 55 with the head portion 54 of the actuating member 50. This position is then retained by the latch member until the pressure build-up in the chamber 44' is sufficient to raise the cap 59 to release the latch 56 for allowing the spring 73 to return the sleeve to the right and to the neutral by-pass position. This same spring action throws the lever 69 forwardly to a center position where it strikes the abutment 90 which prevents its moving into a forward position in one of the opposite slots, the slots being staggered on opposite sides as viewed best in Figure 9.

Previously in the description, it has been stated that the valve unit B at the left side of the structure shown in Figure 5 is identical with valve unit A shown at the right side but which is supplied with fluid under pressure from the pump gears 39 and 41. When the lever 69 is moved to the left and pulled rearwardly, as shown in Figure 9, into the slot 91, the cylinders 28 and 36 at the opposite side of the tractor, or in Figure 1 the cylinders on the upper part of the drawing, are operated by means of fluid delivered through the corresponding flexible conduits 87 and 88 leading from that side of the tractor. If follows that when the lever 69 is moved rearwardly into the center slot 92, both of the arms 66 and 67 are engaged by one of the spaced plates 71 whereby both of the valve structures are operated to simultaneously lift the implements at both sides of the tractor both at the front and at the rear.

Assuming all the implements are in lifted position, they can be lowered individually at either side by shifting the lever 69 to the corresponding side and then moving it forwardly into the corresponding slot 93 at the left or 93' at the right, depending on which side it is desired to have affected. This action, however, will be followed through for the valve unit A at the right, as shown in Figure 5, which is actually at the left of the tractor looking forwardly, as shown in Figure 7. Assuming the latch member 56 is released, rotation of the shaft 51 by forward movement of the lever 69 moves the head portion 54 of the member 50 beyond its pivot axis, as shown in Figure 7, to the left as shown in Figure 16. A ball-valve operating member 94 is pivoted on a pin 95 to the member 50. As the member 50 moves to the left, said valve operating member 94 contacts push pins 96 and 96' extending through the chamber 44' into respective contact with the ball valves 85 and 86. Due to the difference in lever arms between the pivot pin 95 and the two pins 96 and 96', the valve 85 is first opened a small amount as shown in Figure 16. When the lever 69 is moved only a portion of its stroke forwardly, the sleeve member 48 is moved from the neutral position of Figure 12 axially to the position shown in Figure 16 with the arcuate slot 79 in registration with the bore 80 whereby fluid is drained from said bore simultaneously with draining of fluid from the bore 76. If it is desired to drain liquid from the bore 76 only, the lever 69 is moved forwardly to the end of the slot whereby the sleeve 48 is moved to the position shown in Figure 17 closing the bore 80 and also opening the ball valve 86. By this means the front cylinder 28 is connected to the conduit 76 for return of fluid to the reservoir casing 38 whereby the front implement is first lowered and prior to the dropping of the rear implement. This type of delayed action is covered in the Mott application, previously referred to, and is shown here only in sufficient detail to illustrate how it functions in connection with the valve arrangement of this invention. It is to be understood that the valve unit B for the implements at the other side of the tractor works in the same manner. By moving the lever 69 forwardly into the slot 97, the implements at both sides of the tractor can be lowered simultaneously.

Coming now to the principal feature of the invention and referring to Figure 4, the cylinder 28 is provided with a closure head member 98 having a threaded opening 99 for connection to the flexible hose 87. Carried at the rear of said head member 98 is a second cylinder device 100 secured in fluid-tight relationship. This cylinder device includes a piston stop 101 which has a piston rod 102 extending through a packed opening 103 in the closure head member 98 and into the cylinder 28. As illustrated, a metallic packing member 104 abuts a resilient packing member 105 to provide a fluid-tight seal between the two cylinders. The cylinder 100 is also provided with a threaded opening as indicated at 106 for connection of a fluid line 107 which is adapted to be connected to the intermediate conduit 84 in the outlet member 77, previously described and shown in Figure 7. It will be understood that when the implements are lowered the piston 27 of the cylinder 28 moves rearwardly until it engages the piston rod 102 of the stop piston 101.

It is therefore evident that the location of said stop piston determines the ground-working position of the implements.

Referring to Figure 13, if it is desired to move the position of the stop piston 101 into the main cylinder 28, the lever 69 is moved to the right and rearwardly a portion only of the depth of the slot 89 as shown in Figure 13. The movement is such that the slot 78 on the sleeve 48 is brought into registration with the passage 80. In this position of the sleeve 48 pressure is supplied to the main cylinders through the ball valves 85 and 86. This acts to adjust the implements upwardly from their previous ground-working position. As pressure is also supplied through the passage 80, the conduit 84 and the flexible conduit 107 to the cylinder 100, the stop piston 101 moves forwardly to the left, as shown in Figure 4, following the piston 27 of the lifting cylinder 28. As the lever 69 is not moved forwardly in the slot 89, as shown in Figure 9, a sufficient distance to engage the latch 56 with the member 50, the spring 73 immediately returns the device to the open neutral position of Figure 13 when hand-pressure is released on the lever 69. By this means, the implements at either side of the tractor, at the front thereof, are adjusted upwardly independently or simultaneously by moving the lever 69 rearwardly in the central slot 92. It is understood that the implements at the rear of the tractor cannot be hydraulically adjusted by the construction as presently shown. This is relatively immaterial as the shovels at the rear are used primarily to take out the wheel tracks. Their position of adjustment is not so critical and is taken care of by the manually adjustable means 33—34 without much attention on the part of the operator.

To adjust the implements lower for greater working depth when they are in ground-working position, the lever 69 is also used to individually lower the front implements at either side or to lower both simultaneously. Considering only one side, reference is made to Figure 12. The lever 69 is moved to the right and rearwardly into the slot 97 a sufficient distance to engage the push pin 96 and to move the sleeve member 48 to the position shown in Figure 16 whereby the ball valve 85 is opened. In this position the slot 79 registers with the passage 80 whereby fluid is released from the stop cylinder 100 at the same time as fluid is released from the cylinder 28. The piston 27 is then permitted to move rearwardly so long as the valve is open, thereby carrying the stop piston 101 with it the same distance of movement. When the lever is returned to neutral position, the passage 80 is covered, again locking the fluid in the stop cylinder and maintaining the stop piston in position thereafter until adjustment is again desired.

To adjust the implements to a preset working position as determined by the position of the stop piston 101, the sleeve member 40 is moved directly by the lever 69 to the position shown in Figure 17. During such movement the slot 79 passes over the bore 80 without any appreciable flow of liquid in either direction therethrough as there is no fluid pressure on the stop piston 101. By this means an operator may lift the implements and lower them to a previously set working position without any intermediate adjustment.

It will be understood that normally in operating the sleeve 48 to effect lifting of the implement the openings 78 and 79 will pass over the passage 80. However, when lifting or lowering, the action is such that no appreciable amount of flow takes place in either direction during the relatively rapid movement of the opening over the passage 80. The adjustment, therefore, is not disturbed except when the openings 78 and 79 are deliberately alined with the passage 80.

By the construction of parts and operation as above described, means has been provided utilizing a single device and a single operating lever to simultaneously lift and lower implements at both sides and at the rear of the tractor, to selectively lift and lower the implements at either side of the tractor and to effect independent or simultaneous adjustment by power of the front implements at either side of the tractor by means not affected by lifting or lowering operation whereby the implements can be lifted or returned to their initially adjusted positions. This is a very significant feature of operation for farm tractors, as it is necessary to frequently raise the implements for turning at the ends of the rows to return the tractor over the field, without any attention given on the part of the operator, to the ground-working positions of the implements which had been established before lifting the implements. It is desirable, however, at the same time to provide a means for readily adjusting the implements to a deeper or a shallower position without resorting to manual mechanism such as has been used with conventional cylinder power lift devices.

It is also to be understood that adjusting means such as illustrated in connection with a tractor-mounted cultivating device is applicable to all forms of machinery or mechanisms where an adjustment is required along with a relatively larger movement of the power device without affecting the adjustment.

Applicant claims as his invention all modifications of the device as illustrated which fall within the scope of the appended claims.

What is claimed is:

1. An implement adjusting means for tractors having an implement connected thereto, comprising a power-operated lifting device connected to the implement for adjusting the implement to two extreme positions and a part movable coordinately with the adjustment of the implement, said device including a hydraulically operable stop device including an element engageable by said part to determine the limit of movement of the lifting device in one direction, and said stop device being operable to change the position of said element for selectively determining the limit of such lifting device movement.

2. An implement adjusting means for tractors having an implement connected thereto, comprising a power-operated device connected to the implement for adjusting the implement to two extreme positions, said device including a hydraulically actuated stop member selectively positionable to be engaged by an element of the lifting device when said device is moved in one direction distances correlated with the positioning of the stop member, and said stop member being operable when engaged to block further operation of the power-operated device in such direction.

3. An implement adjusting device for tractors having an implement connected thereto, comprising a fluid-pressure pump operated from the power plant of the tractor, a fluid-pressure device connected to the implement for adjusting it to two extreme positions, a stop device settable to determine the limit of movement in one of said positions, and fluid-pressure responsive setting means for the stop device and operable when subjected to the pressure of fluid discharge from said pump to change the location of said stop device.

4. A hydraulic lift system for tractors having an implement connected thereto comprising a hydraulic pump operated from the power plant of the tractor, a fluid-pressure-adjusting device connected to the implement for lifting and lowering the implement, a fluid-pressure-operated stop device located to determine the limit of movement of the adjusting device in one direction, and a valve means for controlling the flow of fluid from the pump to and from said devices.

5. A hydraulic lift system for tractors having a plurality of implements independently connected thereto comprising a hydraulic pump operated from the power plant of the tractor, a separate fluid-pressure device for independently adjusting each of the implements, a separate valve structure for controlling the flow of fluid from the pump to and from each of said fluid-pressure devices, each of said fluid-pressure devices including a main fluid operated piston and an auxiliary adjustable stop piston, said valve means being constructed and operable to supply fluid to and from the main piston alone or to and from both pistons simultaneously whereby the position of the stop may be adjusted or whereby the main piston may be moved and returned to its stopped position.

6. A hydraulic lift system for tractors having a plurality of implements independently connected thereto comprising a hydraulic pump operated from the power plant of the tractor, a separate fluid-pressure device for independently adjusting each of the implements, a separate valve structure for controlling the flow of fluid from the pump to and from each of said fluid-pressure devices, each of said fluid-pressure devices including a fluid-operated piston and an auxiliary hydraulically adjustable stop means, said valve means being constructed and operable to supply fluid to and from the piston alone or to and from the piston and the stop means simultaneously whereby the piston of the stop means may be adjusted with movement of the piston or whereby the main piston may be moved and returned to its stopped position.

7. In a tractor and implement combination, means operable from the power plant of the tractor for delivering fluid under pressure, means for moving the implement into and out of operating position including an expansible fluid pressure device, valve means for controlling the delivery of fluid under pressure thereto, stop means operated by fluid under pressure and thereby positionable to determine the limit of movement of said pressure-operated device when moving the implement into operating position, said valve means including means to control the pressure operable on said stop means, an operating means for said valve means including means to simultaneously supply pressure to or relieve pressure from the stop device and the implement-moving hydraulic device for adjusting the operating position of the implement and to supply pressure or relieve pressure only to the implement-moving fluid-pressure device for lifting and lowering the implement without disturbing its limit of movement determined by a previously selected position of the stop means.

8. In a tractor and implement combination, a means for developing fluid under pressure operable from the power plant of the tractor, fluid-pressure-operated means for moving the implement between a lifted position and an operating position, said latter means including means for adjusting the implement in its operating position and including a valve means, a control mechanism and an actuating means therefor manually operable into selectable locations, said actuating means in certain of its manually selectable locations being operable to adjust the implement in its operating position and being operable in other of its manually selectable locations to move the implement into and out of operating position without affecting the adjustment.

9. In a tractor and implement combination, a means for developing fluid under pressure operable from the power plant of the tractor, fluid-pressure-operated means for moving the implement into and out of operating positions, said latter means including means for adjusting the implement in its range of operating positions and including a control mechanism and a single operating lever manually operable into selectable locations for actuating said mechanism, said lever in certain of its manually selectable locations being operable to adjust the implement and being operable in other of its manually selectable locations to move the implement into and out of its adjusted operating position without affecting the adjustment.

10. An implement lifting and adjusting system for tractors having an implement connected thereto, comprising a power-operated device connected to the implement for lifting and lowering the same, a power-operated stop device located to determine the limit of movement of the lifting and lowering device in one direction, and means for controlling the application of power to said devices to selectively determine concurrent or individual operation.

11. An implement lifting and adjusting system for tractors having an implement connected thereto, comprising a power-operated device connected to the implement for lifting and lowering the same, a power-operated stop device located to determine the limit of movement of the lifting and lowering device in one direction, and means including a single control member manipulative for determining the application of power to said devices to selectively incur concurrent operation of said devices or individual operation of the lifting and lowering device while leaving the stop device at a selected position to establish a limit for the movement of the lifting and lowering device in the one direction.

12. An implement adjusting means for tractors having an implement connected thereto, comprising a power-operated device connected to the implement for adjusting the implement to two extreme positions, manual control means for said device, said device including a stop member positionable to be engaged by an element of the lifting device when moved in one direction, power-operated means for altering the position of said stop member, and manual control means for said power-operated means, said stop member being operable when engaged to discontinue operation of the power-operated device.

13. An implement adjusting means for tractors having an implement connected thereto, said implement having a part supported for adjustment, comprising a manually controllable adjusting device connected to said implement part for adjusting said part between two positions, an engageable stop device cooperatively arranged with respect to said device, and manually controllable power operable means for positioning said stop device to determine the limit of movement of the adjusting device in one direction.

14. An implement adjusting device for tractors having an implement connected thereto, comprising fluid-pressure pumping means operated from the power plant of the tractor, a fluid-pressure operated device connected to the implement for adjusting it to two extreme positions, a stop device located to determine the limit of movement in one of said extreme positions, power operable fluid-pressure operated means operable to change the location of said stop device, fluid connections between said pumping means and said fluid-pressure operated device and said fluid-pressure operated means, valve means operable when actuated to control the supply of fluid to the fluid-pressure device and to thereby move the implement from one extreme position to the other and to then automatically discontinue the application of fluid pressure to said device, and additional valve means operable when actuated to control the supply of fluid to the fluid-pressure operated means for selectively locating said stop device in any position throughout its range of movement.

15. An implement adjusting device for tractors having an implement connected thereto, comprising a fluid-pressure pump operated from the power plant of the tractor, a fluid-pressure operated device connected to the implement for adjusting it to two extreme positions, a stop device located to determine the limit of movement in one of said extreme positions, power operable fluid-pressure operated means operable to change the location of said stop device, fluid connections between said pump and said fluid-pressure operated device and said fluid-pressure operated means, valve means operable when actuated to move the implement from one extreme position to the other and to then automatically discontinue the application of fluid pressure to the fluid-pressure operated device, and additional valve means operable to actuate the fluid-pressure operated means for selectively locating said stop device in any position throughout its range of movement.

16. An implement adjusting means for tractors having an implement connected thereto, said implement having a part supported for adjustment, comprising a manually controllable adjusting device connected to said implement part for adjusting said part between two positions, an engageable stop device cooperatively arranged with respect to said device, and manually controllable power operable means for positioning said stop device to determine the limit of movement of the adjusting device in one direction.

17. An implement adjusting means for tractors having an implement connected thereto, said implement having a functional part supported for adjustment, comprising manually controllable means connected to said implement part for adjusting said part between two positions, a stop device, said adjusting means including an element engageable with said stop device to limit movement of the implement part in one direction, said stop device including a cylinder and piston device and pump means operable to position the piston in any one of a plurality of positions whereby the stop device may be adjusted to predetermine the limit of movement of the lifting means in one direction.

18. The combination of a tractor having a power plant, an implement structure flexibly connected to the tractor and having a movable part to be adjusted, and an implement lifting and adjusting device, said device comprising a fluid pump connected to the power plant of the tractor for operation thereby, a fluid reservoir, a cylinder and piston device located on said implement at a point removed from said reservoir and being connected to the implement part for adjusting the same, valve structure associated with the reservoir and said pump, actuating means for said valve structure, a flexible fluid conduit connecting said cylinder and the valve structure, said valve structure having means operable to deliver fluid under pressure from the pump to the cylinder through said conduit for movement of the piston in one direction and means to provide for return flow of fluid for movement of the piston in the other direction, a second auxiliary flexible conduit serving as means for confining a pressure transmitting medium connecting the valve structure and the cylinder and piston device, a second auxiliary piston device carried by and operating in conjunction with said first named device and being associated therewith, and with the auxiliary conduit, said second piston device being operative to actuate the valve structure to stop the flow of fluid to the first named cylinder upon the first named piston reaching a predetermined position in its path of travel.

19. The combination of a tractor having a power plant, an implement structure flexibly connected to the tractor and having a movable part to be adjusted, and an implement lifting and adjusting device, said device comprising a fluid pump connected to the power plant of the tractor for operation thereby, a fluid reservoir, a cylinder and piston device located on said implement at a point removed from said reservoir and being connected to the implement part for adjusting the same, valve structure associated with the reservoir and said pump, actuating means for said valve structure, a flexible fluid conduit connecting said cylinder and the valve structure, said valve structure having means operable to deliver fluid under pressure from the pump to the cylinder through said conduit for movement of the piston in one direction and means to provide for return flow of fluid for movement of the piston in the other direction, a second auxiliary flexible fluid conduit serving as means for confining a pressure transmitting fluid connecting the valve structure and the cylinder and piston device, a second auxiliary fluid pressure piston device carried by and operating in conjunction with said first named device and being associated therewith, and with the auxiliary conduit, said second piston device being operative to actuate the valve structure to stop the flow of fluid to the first named cylinder upon the first named piston reaching a predetermined position in its path of travel.

20. The combination of a tractor having a power plant, an implement structure flexibly connected to the tractor and having a movable part to be adjusted, and an implement lifting and adjusting device, said device comprising a fluid pump operably connected to the power plant of the tractor for operation thereby, a fluid reservoir, a cylinder and piston device located at a point removed from the reservoir, valve structure associated with the reservoir and the pump, fluid conducting means interconnecting said pump, said reservoir, and said valve structure, actuating means for said valve structure, a flexible fluid conduit connecting said cylinder and the valve structure, said valve structure having means operable to deliver fluid under pressure from the pump to the cylinder through said conduit for movement of the piston in one direction and means providing for return flow of fluid for movement of the piston in the other direction, a pressure responsive device incorporated in the fluid conducting means for stopping the supply of fluid through the flexible conduit upon the attaining of a predetermined pressure in said pressure supply conduit, and a stop device having a shiftable element structurally associated with said piston positionable to determine the limit of movement of the piston in one direction, the engagement of the piston with the stop element providing means for bringing about the building up of pressure sufficient to actuate the pressure responsive device, said stop being adjustable to a plurality of positions to predetermine the position at which the piston is stopped in its movement and at which the supply of fluid under pressure to the cylinder is discontinued.

21. The combination of a tractor having a power plant, an implement structure flexibly connected to the tractor and having a movable part to be adjusted, and an implement lifting and adjusting device, said device comprising a fluid pump operably connected to the power plant of the tractor for operation thereby, a fluid reservoir, a cylinder and piston device located at a point removed from the reservoir, valve structure associated with the reservoir and the pump, fluid conducting means interconnecting said pump, said reservoir, and said valve structure, actuating means for said valve structure, a flexible fluid conduit connecting said cylinder and the valve structure, said valve structure having means operable to deliver fluid under pressure from the pump to the cylinder through said conduit for movement of the piston in one direction and means providing for return flow of fluid for movement of the piston in the other direction, said valve structure including a pressure responsive device connected to the valve structure for shifting it automatically from a position in which fluid under pressure is supplied to the conduit to a position in which fluid supply to said conduit is cut off upon the attaining of a predetermined pressure in said pressure supply conduit, and a stop device having a shiftable element structurally associated with said piston positionable to determine the limit of movement of the piston in one direction, the engagement of the piston with the stop element providing means for bringing about the building up of pressure sufficient to actuate the pressure responsive device, said stop being adjustable to a plurality of positions to predetermine the position at which the piston is stopped in its movement and at which the supply of fluid under pressure to the cylinder is discontinued.

22. The combination of a tractor having a power plant, an implement structure flexibly connected to the tractor and having a movable part to be adjusted, and an implement lifting and adjusting device, said device comprising fluid pressure pumping means operated from the tractor power plant, a unitary fluid pressure operated device operable in two directions and removably connected to the adjustable implement element to provide for movement thereof in two directions, a stop device permanently associated structurally with said fluid pressure operated device, said stop device including adjustable means locatable to determine the limit of movement in one of said directions whereby different movement limiting positions may be determined, flexible fluid conducting means between said pump means and said fluid pressure operated device, valve mechanism interposed in said fluid conducting means between the pumping means and the pressure operated device, said valve mechanism including valve means operable when actuated to supply fluid to the pressure operated device, a pressure responsive device associated with the fluid conducting means and provided with means operable upon the supply of a fluid thereto under a predetermined pressure to stop the supply of fluid under pressure to the fluid pressure operated device.

23. The combination of a tractor having a power plant, an implement structure flexibly connected to the tractor and having a movable part to be adjusted, and an implement lifting and adjusting device, said device comprising fluid pressure pumping means operated from the tractor power plant, a unitary fluid pressure operated device operable in two directions and removably connected to the adjustable implement element to provide for movement thereof in two directions, a stop device permanently associated structurally with said fluid pressure operated device, said stop device including adjustable means locatable to determine the limit of movement in one of said directions whereby different movement limiting positions may be determined, flexible fluid conducting means between said pump means and said fluid pressure operated device, valve mechanism interposed in said fluid conducting means between the pumping means and the pressure operated device, said valve mechanism including valve means operable when actuated to supply fluid to the pressure operated device, a pressure responsive device associated with said valve means and provided with means operable upon the supply of a fluid thereto under a predetermined pressure to operate the valve means from a position in which fluid is supplied under pressure to the fluid pressure operated device to a position in which the liquid is by-passed, said pressure responsive device being connected to the fluid conducting means and to the fluid pressure operated device to deliver liquid to said pressure responsive device and to thereby bring about actuation of the valve means when pressure in the fluid conducting means reaches the predetermined pressure at which the pressure responsive means is operable.

24. The combination of a tractor having a power plant, an implement structure flexibly connected to the tractor and having a movable part to be adjusted, and an implement lifting and adjusting device, said device comprising fluid pressure pumping means operated from the tractor power plant, a fluid pressure operated device operable in two directions connected to the adjustable implement element to provide for movement thereof in two directions, a stop device associated with said fluid pressure operated device locatable to determine the limit of movement in one of said directions, means to adjust said stop device whereby different movement limiting positions may be determined, a flexible fluid conducting means between said pump means and said fluid pressure operated device, and valve mechanism interposed in said fluid conducting means between the pumping means and the pressure operated device, said valve mechanism including valve means operable when actuated to supply fluid to the pressure operated device.

25. The combination of a tractor having a power plant, an implement structure flexibly connected to the tractor and having a movable part to be adjusted, and an implement lifting and adjusting device, said device comprising fluid pressure pumping means operated from the tractor power plant, a fluid pressure operated device operable in two directions connected to the adjustable implement element to provide for movement thereof in two directions, a stop device associated with said fluid pressure operated device locatable to determine the limit of movement in one of said directions, means to adjust said stop device whereby different movement limiting positions may be determined, a flexible fluid conducting means between said pump means and said fluid pressure operated device, valve mechanism interposed in said fluid conducting means between the pumping means and the pressure operated device, said valve mechanism including valve means operable when actuated to supply fluid to the pressure operated device, and a pressure responsive device associated with said valve means and provided with means operable upon the supply of a liquid thereto under a predetermined pressure to operate the valve means from a position in which fluid is supplied under pressure to the fluid pressure operated device to a position in which the liquid is by-passed, said pressure responsive device being connected to the fluid conducting means and to the fluid pressure operated device to deliver liquid to said pressure responsive device and to thereby bring about actuation of the valve means when pressure in the fluid conducting means reaches the predetermined pressure at which the pressure responsive means is operable.

26. In combination with a tractor having an operator's station and a power plant, an implement flexibly connected to the tractor having an adjustable part, a fluid power operated device including a source of fluid pressure on the tractor deriving power therefrom, a cylinder adapted to be associated with the implement having a piston slidable therein connected to said adjustable part for moving the latter to an extent corresponding to the movement of the piston, flexible means transmitting fluid under pressure from said pressure source to said cylinder to force said piston in one direction therein, means providing for movement of the piston in the other direction, means accessible to the tractor operator for controlling the flow of fluid from said pressure source to said cylinder, auxiliary adjusting means associated with the cylinder for selectively limiting the stroke of the piston in said cylinder in one direction and therefore the extent of movement of said implement adjustable part, and means accessible to the operator from his station on the tractor for selectively controlling said auxiliary adjusting means.

27. In combination with a tractor having an operator's station and a power plant, an implement flexibly connected to the tractor having an adjustable part, a fluid power operated device including a source of fluid pressure on the tractor deriving power therefrom, a cylinder adapted to be associated with the implement having a piston slidable therein connected to said adjustable part for moving the latter to an extent corresponding to the movement of the piston, flexible conduit means provided for transmitting fluid under pressure from said pressure source to said cylinder to move said piston in one direction therein, said conduit means also providing for return flow of fluid from the cylinder to permit movement of the piston in the other direction, means accessible to the tractor operator for controlling the flow of fluid from said pressure source to said cylinder, auxiliary adjusting means associated with the cylinder for selectively limiting the stroke of the piston in said cylinder and therefore the extent of movement of said implement adjustable part, and means accessible to the operator from his station on the tractor for selectively controlling said auxiliary adjusting means.

RUSSEL D. ACTON.

REFERENCES CITED

The following references are of record in the file of this patent:

UNITED STATES PATENTS

| Number | Name | Date |
| --- | --- | --- |
| 715,291 | Potter | Dec. 9, 1902 |
| 1,538,167 | Chappell | May 19, 1925 |
| 1,759,647 | Kincannon | May 20, 1930 |
| 1,940,508 | Proctor | Dec. 19, 1933 |
| 2,337,637 | Brown | Dec. 28, 1943 |
| 2,337,638 | Brown | Dec. 28, 1943 |
| 2,361,326 | Silver | Oct. 24, 1944 |
| 2,383,689 | Silver | Aug. 28, 1945 |

FOREIGN PATENTS

| Number | Country | Date |
| --- | --- | --- |
| 3,783 | Great Britain | 1914 |
| 84,804 | Switzerland | 1920 |